US006191795B1

(12) United States Patent
Liepa

(10) Patent No.: US 6,191,795 B1
(45) Date of Patent: Feb. 20, 2001

(54) ELLIPSOIDAL PROJECTION MAPPING

(75) Inventor: Peter Liepa, Toronto (CA)

(73) Assignee: Silicon Graphics, Inc., Mountain View, CA (US)

( * ) Notice: Under 35 U.S.C. 154(b), the term of this patent shall be extended for 0 days.

(21) Appl. No.: 09/163,200

(22) Filed: Sep. 30, 1998

(51) Int. Cl.$^7$ ................................. G06T 7/40; G06T 7/60
(52) U.S. Cl. ........................... 345/430; 345/436; 702/169
(58) Field of Search .................... 345/430, 436, 345/326, 139, 420, 437, 421, 427, 429, 433, 438, 439, 126; 382/296; 702/169, 167; 434/213, 211; 73/65.02

(56) References Cited

U.S. PATENT DOCUMENTS

| | | | |
|---|---|---|---|
| 4,677,576 | * | 6/1987 | Berlin, Jr. et al. ................ 345/420 |
| 4,727,365 | * | 2/1988 | Bunker et al. .................... 345/139 |
| 5,561,756 | * | 10/1996 | Miller et al. .................... 345/326 |
| 6,016,152 | * | 1/2000 | Dickie ........................... 345/436 |

OTHER PUBLICATIONS

Williamson et al., *Calculus of Vector Functions*, 3$^{rd}$ Edition, Prentice–Hall, 1972, pp. 310–322 and 361–376.

Kiyoshi, I. (Ed.), *Encyclopedic Dictionary of Mathematics*, 2$^{nd}$ Edition, MIT Pres, 1993, pp. 334–337 and 1006–1007.

Eisenhart, L.P., *A Treatise on the Differential Geometry of Curves and Surfaces*, Ginn and Co., 1909 (reprinted 1960), pp. 226–231.

Akhiezer, N.I., *Elements of the Theory of Elliptic Functions*, American Mathematical Society, 1990, pp. 175–181.

Gray, A., *Modern Differential Geometry of Curves and Surfaces*, CRC Press, 1993, pp. 424–428.

Cattani et al., "Boundary integration over Linear polyhedra," *Computer–Aided Design*, vol. 22, No. 2, Mar. 1990, pp. 130–135.

Eck et al., "Multiresolution Analysis of Arbitrary Meshes," *Computer Graphics Proceedings, Annual Conference Series*, Aug. 6–11, 1995, pp. 173–180.

* cited by examiner

Primary Examiner—Mark R. Powell
Assistant Examiner—Thu-Thao Havan
(74) *Attorney, Agent, or Firm*—Sterne, Kessler, Goldstein & Fox P.L.L.C.

(57) ABSTRACT

A projective body is aligned with a surface to generate texture coordinates for the surface. The present invention includes selecting an appropriate projective body for a given surface, orienting and positioning the surface with respect to the projective body, projecting the surface onto the projective body, and then mapping the projective body onto the texture rectangle. An inertial ellipsoid is used to orient the surface and the projective body. The inertial ellipsoid can also be used as the projective body. Ellipsoidal coordinates are preferably used to project the surface onto the projective body.

18 Claims, 11 Drawing Sheets

302

ELLIPSOIDAL PROJECTION MAPPING

BACKGROUND OF THE INVENTION

1. Field of the Invention

The present invention relates generally to computer graphics, and more particularly to the generation of texture coordinates for a surface using an ellipsoidal projective body.

2. Related Art

In the field of computer graphics, texture mapping is a well known technique for imparting realism to rendered surfaces. A surface S is amenable to this technique if there is a defined mapping M from S to a rectangular region T known as texture space. The region T is typically identified with an image whose values modulate or define, via the mapping M, rendered attributes of the surface S.

For a parametric surface $$S(u,v) = (X(u,v), Y(u,v), Z(u,v))$$

such a mapping exists and is simply the inverse mapping $S^{-1}$. However, for non-parametric surfaces (e.g., implicit or polygonal surfaces), such a mapping does not exist a priori. Mappings must be therefore be constructed for these non-parametric surfaces.

Planar, cylindrical or spherical projections are commonly used methods for constructing such mappings. For example, cylindrical projection mapping uses a cylinder of length L positioned so that it encloses the surface to be mapped. Each point on the cylinder can be coordinatized by $(y, \theta)$ where y is the distance of the point from the base of the cylinder, and $\theta$ is an angle that sweeps around the axis of the cylinder. Each point on the surface can be assigned the coordinate $(y, \theta)$ of the nearest corresponding point on the cylinder, and in this way the surface can be mapped to the rectangle $[0, L] \times [0, 2\pi]$. By scaling, the surface can be mapped to an arbitrary texture rectangle T.

Conventional projection mapping embeds an unmapped surface in a curvilinear coordinate system defined by a given projective body in a given position and orientation. In general we can consider a curvilinear coordinate system $(u_1, u_2, u_3)$, where $$x = x(u_1, u_2, u_3), y = y(u_1, u_2, u_3), z = z(u_1, u_2, u_3)$$

$$u_1 = u_1(x,y,z), u_2 = u_2(x,y,z), u_3 = u_3(x,y,z)$$

Examples of curvilinear coordinate systems are planar (also known as cartesian), cylindrical and spherical coordinate systems. A point (x,y,z) on an unmapped surface embedded in such a curvilinear coordinate system will map to curvilinear coordinates $(u_1, u_2, u_3)$. By dropping one of these coordinates (which is equivalent to the mathematical operation of projection), we can coordinatize the point (x,y,z) as a pair of coordinates $(u_i, u_j)$, thereby mapping the surface onto a portion of the plane.

For example, consider using a sphere of unit radius centered at the origin as a projective body. The sphere can be parameterized by the angular coordinates $(\phi, \theta)$, where $\phi$ is the azimuth angle (around the vertical z axis) and $\theta$ is the elevation angle (from the horizontal xy plane). Each point (x, y, z) on the unmapped surface maps to the 3D coordinates $(r, \phi, \theta)$. Dropping r maps the 3D coordinates to the nearest point on the sphere $(\phi, \theta)$, thus mapping the surface to the texture rectangle $[0, 2\pi] \times [0, \pi]$.

Conventional mapping systems and methods require the user to choose a projective body (i.e., a rectangle, cylinder, or sphere) and then position and orient the body around the surface which is to be mapped. Manually positioning and orienting a projective body can be time consuming and, if not done correctly, can result in mappings that either make poor use of the texture rectangle or introduce a high degree of distortion. A need therefore exists for an improved system and method for positioning and orienting a projective body.

Furthermore, conventional projective bodies used for projection texture mapping often don't "fit" surfaces very well, because they have limited degrees of freedom within which they can be altered. For instance, a sphere can only be altered by its radius, a cylinder only by its length and radius. Requiring a user to select an appropriate projective body can also lead to mistakes and poor texture mappings. A need therefore also exists for a projection texture mapping which uses a projective body that can be modified to better fit surfaces, preferably where the dimensions of the projective body are chosen automatically.

SUMMARY OF THE INVENTION

Briefly stated, the present invention is directed to a system and method for aligning a projective body with a surface and generating texture coordinates for the surface.

A preferred embodiment of the present invention includes selecting an appropriate projective body for a given surface, orienting and positioning the surface with respect to the projective body, projecting the surface onto the projective body, and then mapping the projective body onto the texture rectangle. An inertial ellipsoid is preferably used to orient the surface and the projective body. The inertial ellipsoid is also preferably used as the projective body. Furthermore, ellipsoidal coordinates are preferably used to project the surface onto the projective body.

An advantage of the present invention is that a projective body and a surface are automatically positioned and oriented with respect to one another. This feature relieves the user of having to manually position and orient either the surface or the projective body.

An advantage of the present invention is that ellipsoidal projective bodies can better fit the surfaces that are to be projected. Besides position and orientation, ellipsoids have more degrees of freedom than a sphere or rectangle. Ellipsoids are defined by three axes, one along each of the x, y, and z axes, whereas a sphere has one degree of freedom (i.e., a radius) and a rectangle has two (i. e., a length and a width). This added degree of adjustability allows a user to modify a given ellipsoid to "tune" the projection.

Another advantage of the present invention is that ellipsoidal projective bodies generalize rectangles, cylinders and spheres. That is, the axes of an ellipsoid can be modified such that the resulting ellipsoid approximates a rectangle (one axis set to zero), a cylinder (one axis long in relation to the other two), or a sphere (all three axes approximately equal).

Another advantage of the present invention is that ellipsoidal projective bodies don't have "poles" like spherical projective bodies. For a spherical projection, the small areas around the poles map in a highly distorted manner across the top and bottom of the texture rectangle.

Another advantage of the present invention is the automatic generation of a projective body having an approximate fit to the surface. The inertial ellipsoid can be calculated automatically, i.e., without any input from the user, and used as a projective body. The inertial ellipsoid is a first order approximation of the shape and orientation of the surface.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE EMBODIMENTS

Overview of the Environment

Figure 1:
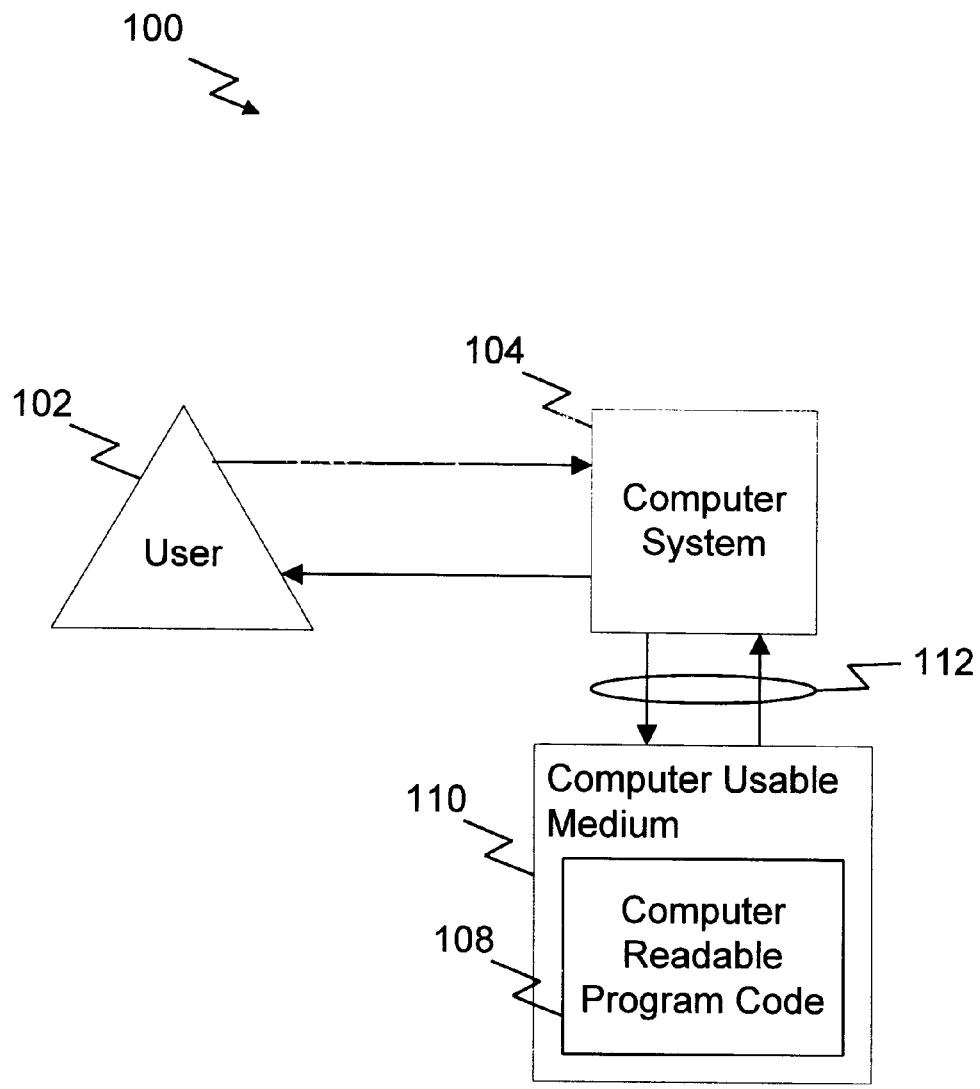
FIG. 1 is a block diagram of a digital computer environment within which the present invention is used.

FIG. 1 is a block diagram of a digital computer environment 100 within which the present invention is used. A user 102 interacts with a computer system 104 according to conventional user interface techniques. The present invention is preferably implemented as computer readable program code 108 stored on a computer usable medium 110, accessed via a communication link 112. Computer system 104 operates under the control of computer readable program code 108.

Computer system 104 represents any computer system known to those skilled in the art with sufficient capability (i.e., both memory and processing power) to execute computer readable program code 108. Examples of computer system 104 include, but are not limited to, a microcomputer, workstation, or terminal connected to a central processor.

Computer usable medium 110 is any digital memory capable of storing computer readable program code 108. Examples of computer usable medium 110 include, but are not limited to, hard disks (both fixed and portable), floppy disks, and CD-ROMs.

Communication link 112 provides the communication pathway between computer system 104 and computer usable medium 110. Communication link 112 includes, but is not limited to, parallel cables, local area networks, wide area networks, the Internet, and any other combination of electrical equipment designed to pass an electrical signal from one point to another.

User 102 communicates with computer system 104 according to conventional user input/output (I/O) techniques. Computer system 104 (under the control of computer readable program code 108) provides output to user 102 according to the present invention via video displays and audio messages, for example. User 102 provides input to computer system 104 via a keyboard, mouse, joystick, voice recognition, or any other type of input device known to those skilled in the art.

The present invention is preferably implemented as computer readable program code 108. Computer readable program code 108 provides the instructions necessary for computer system 104 to execute the functionality described below. Those skilled in the art will recognize that computer readable program code 108 might be implemented in any computer language (e.g., C) acceptable to computer system 104.

The present invention is described below in terms of computer graphics displays and operations performed upon these displays. Example graphical displays are provided, along with flowcharts which describe various operations performed on the displays. Those skilled in the art will readily recognize how to implement the graphical displays and operations on those displays as computer readable program code 108.

Overview of the Invention

Figure 2:
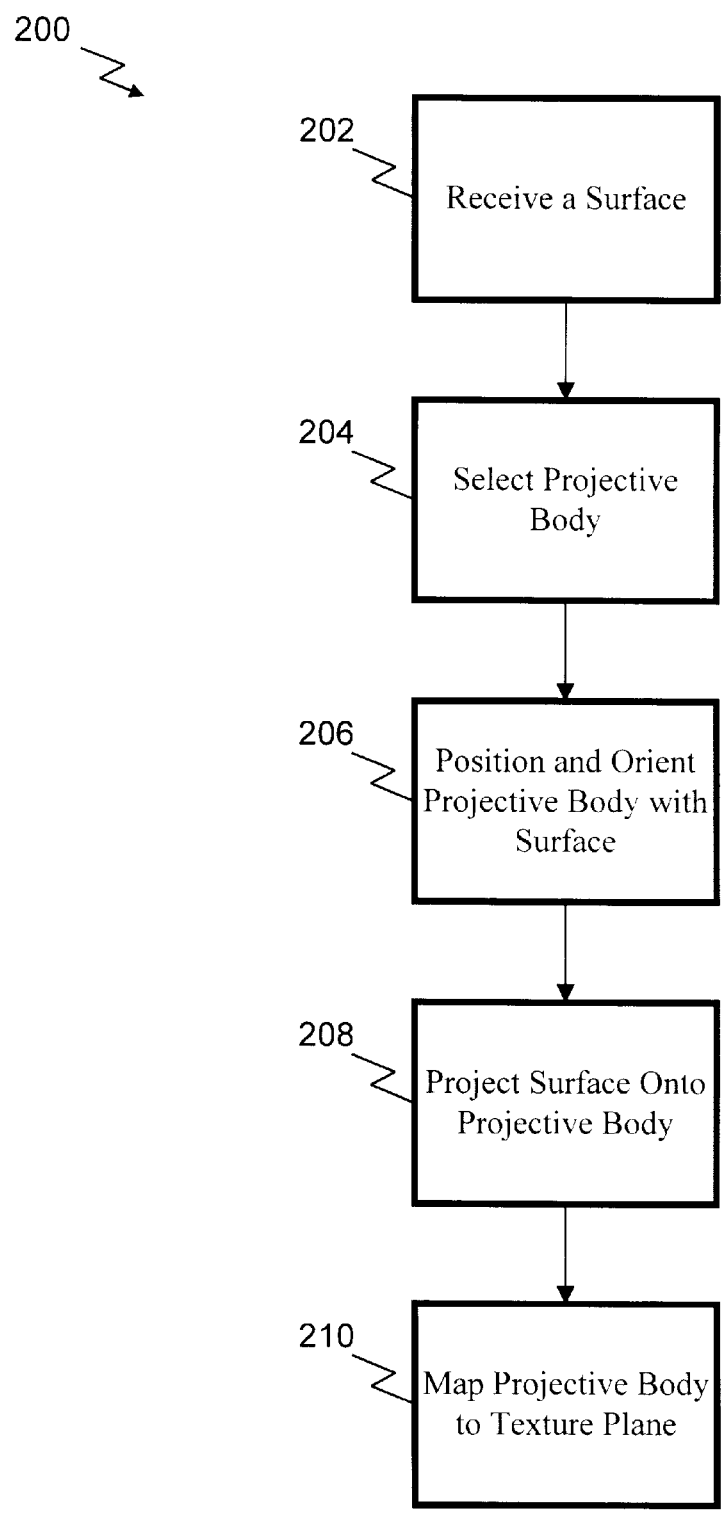
FIG. 2 is a flowchart illustrating the functions performed according to the present invention.

The purpose of this section is to provide an overview of the functionality encompassed by the present invention. FIG. 2 is a flowchart 200 describing functions performed by computer system 104 under the control of computer readable program code 108 according to the present invention, and the relative order in which these functions preferably occur. Those skilled in the art will recognize that these steps might equivalently be performed in different sequence, and still achieve the results described below.

The present invention is directed to a system and method for aligning a surface with a projective body and calculating texture coordinates for the surface. By the operation of the present invention, texture coordinates (u, v) are calculated for each point (x, y, z) on the surface of interest. These texture coordinates are used by a graphics rendering system to assign a particular texture value to each point (x,y,z) on the surface.

Figure 3A:
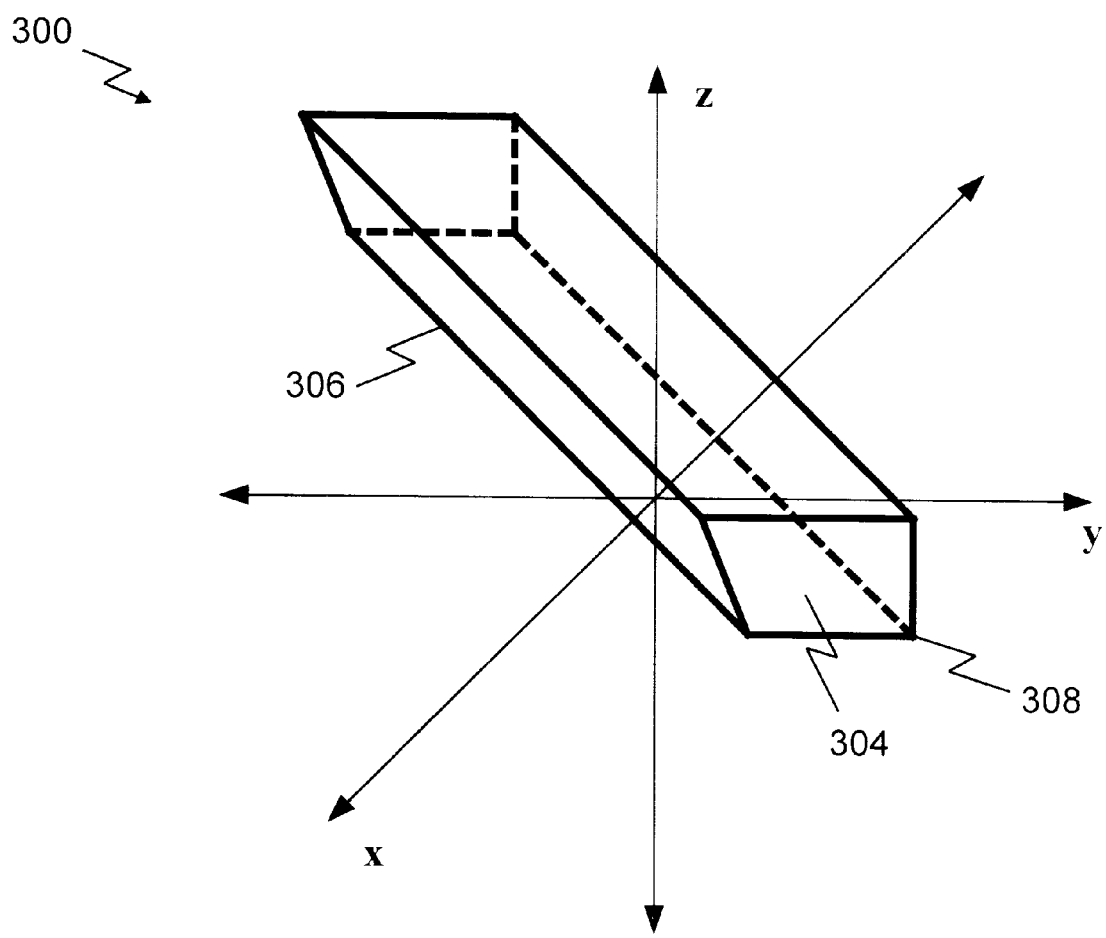
FIG. 3A depicts an example surface.

In step 202, computer system 104 receives a surface. FIG. 3A depicts an example surface 300. The functionality of the present invention is described below with respect to surface 300—those skilled in the art will recognize how these operations would apply to any arbitrary surface. Those skilled in the art will also recognize that surface 300 can be received from any digital memory accessible via communication link 112, not just computer usable medium 110.

In a preferred embodiment, surface 300 is a polygonal surface that includes one or more surface primitives 304. A surface primitive 304 is a surface region bounded by surface edges 304. A surface vertex 308 is the point at which two or more surface edges 306 meet. Example surface 300 is a three-dimensional rectangular box that includes six surface primitives 304, eight surface vertices 308, and twelve surface edges 306. Surface 300 might be defined in two or three dimensions. Further, though polygonal surfaces are commonly used in computer graphics operations, those skilled in the art will recognize that the techniques described below apply equally well to other types of surfaces.

Figure 3B:
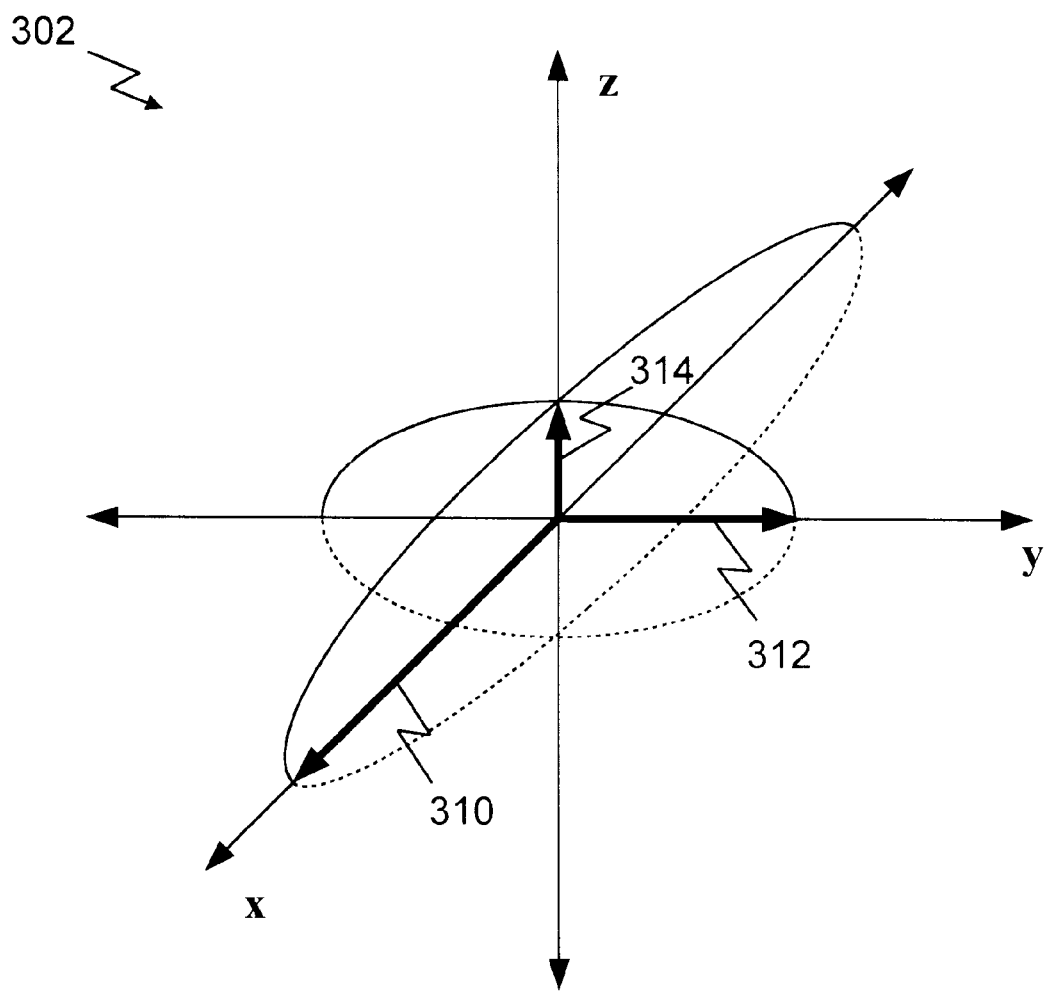
FIG. 3B depicts an ellipsoidal projective body.

In step 204, a projective body is selected, preferably an ellipsoid. FIG. 3B depicts an ellipsoidal projective body 302. As is well known in the art, ellipsoidal projective body 302 is completely defined by a first axis 310, a second axis 312, and a third axis 314. As described above, other example projective bodies include a sphere, cylinder, and rectangle.

In step 206, surface 300 and projective body 302 are positioned and oriented with respect to one another. In a preferred embodiment, surface 300 is shifted and rotated to achieve the position and orientation of projective body 302, as shown in FIG. 3B. This approach is preferred because the equations presented below are derived under the assumption that ellipsoidal projective body 302 is centered at the origin and oriented such that its longest axis (first axis 310) falls along the x axis, its second longest axis (second axis 312) falls along the y axis, and its shortest axis (third axis 314) falls along the z axis. Alternatively, projective body 302 could be shifted and rotated to achieve the position and orientation of surface 300. Those skilled in the art will recognize that these alternative embodiments are conceptually equivalent, but result in different equations. Only the first alternative is described below.

Surface 300 is preferably shifted such that its center of mass is positioned at the origin of the coordinate system, just as ellipsoidal projective body 302 is in FIG. 3B. Once surface 300 is shifted, an inertial ellipsoid is preferably calculated, based on shifted surface 300, and used to determine the rotation necessary to correctly orient surface 300 with projective body 302. Note that although an ellipsoid is preferably chosen as projective body 302, the methods described herein can also be used to position and orient any conventional projective body 302, such as a sphere, cylinder, or rectangle, prior to projection texture mapping.

In step 208, surface 300 is projected onto projective body 302 (as described above, preferably an ellipsoid). The projection onto an ellipsoidal projective body is preferably accomplished by calculating ellipsoidal coordinates (u', v', w') for each point on surface 300, and then dropping one of the ellipsoidal coordinates (w'). Where surface 300 is a polygonal surface, ellipsoidal coordinates are preferably calculated for each surface vertex 308.

Figure 4:
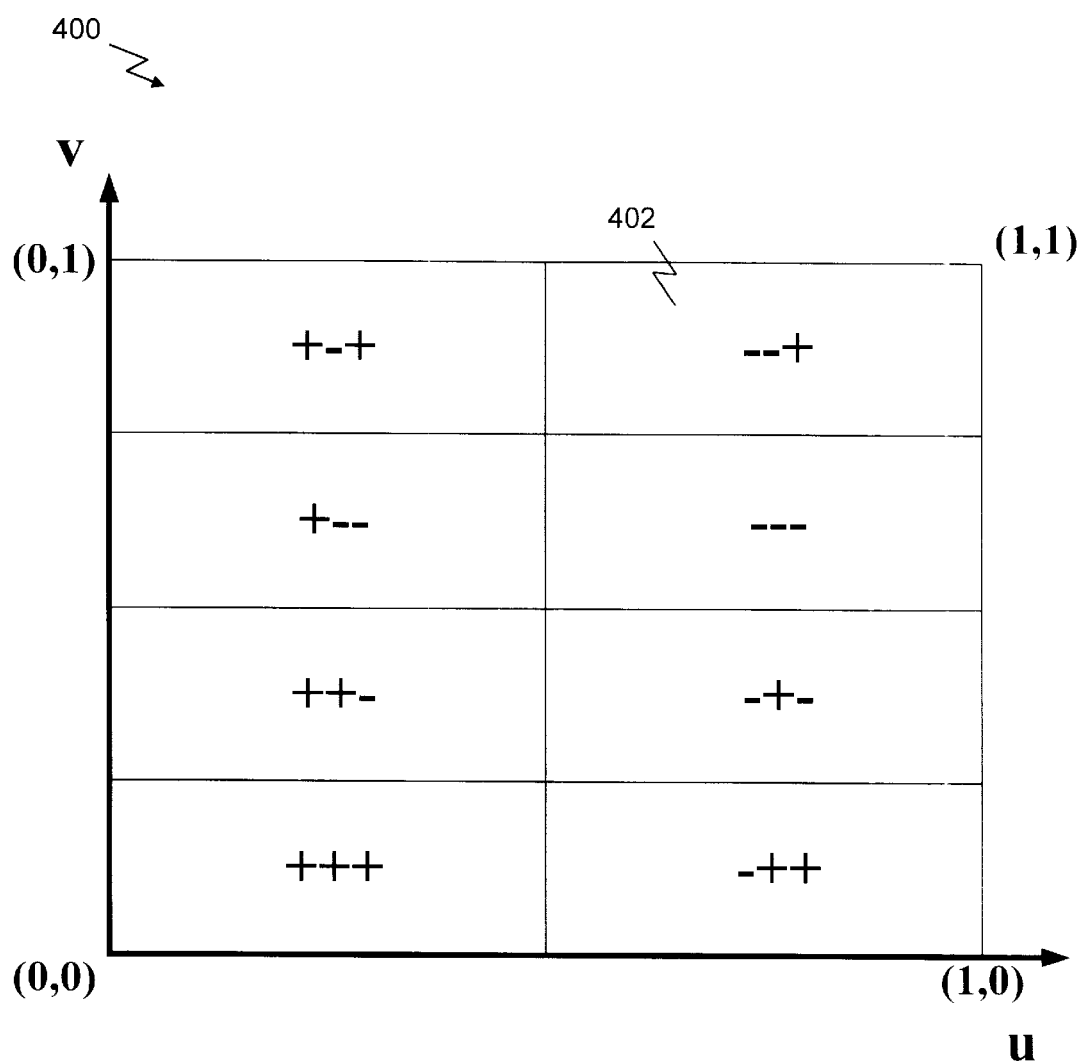
FIG. 4 depicts a texture rectangle divided into eight texture sub-rectangles.

In step 210, projective body 302 is mapped to the texture rectangle. FIG. 4 depicts an example texture rectangle 400. As shown, texture rectangle 400 is defined in two dimensions, with coordinates (u, v). As described below, texture rectangle 400 is preferably divided into eight texture sub-rectangles 402. The mapping of step 210 associates a point (u, v) on texture rectangle 400 with each point (u', v') on projective body 302.

This completes the texture mapping from surface 300 to texture rectangle 400. In other words, each point (x,y,z) on surface 300 now has associated with it a texture coordinate (u, v) on texture rectangle 400.

In a preferred embodiment, steps 202 through 210 are repeated until a desired mapping between surface 300 and texture rectangle 400 is achieved. A set of texture coordinates (u, v) are stored with each point (x,y,z) on surface 300 within computer system 104. Thereafter, when rendering surface 300, an appropriate texture value for each point on surface 300 can be found by accessing the associated texture coordinate (u, v) on texture rectangle 400 and retrieving the texture value stored at that location. When surface 300 is a polygonal surface, texture coordinates (u, v) are preferably calculated for each surface vertex 308. Textures for each surface primitive 304 can then be determined according to conventional texture mapping techniques.

Selecting and Orienting a Projective Body
Selecting a Projective Body

In step 204, user 102 selects projective body 302. As is known in the art, any arbitrary one-, two-, or three-dimensional body can be used as a projective body for the purpose of projection mapping. The following description will assume that, as is preferred, an ellipsoid is chosen in step 204. However, one aspect of the present invention involves the positioning and orienting of surface 300 with any arbitrary projective body, so long as the projective body is positioned and aligned as shown in FIG. 3C. This will be described in greater detail below.

The ellipsoidal projective body 302 is defined by the equation $$\frac{x^2}{A} + \frac{y^2}{B} + \frac{z^2}{C} = 1, \text{ where } A > B > C > 0$$

This ellipsoid has first axis 310 of length $\sqrt{A}$, second axis 312 of length $\sqrt{B}$, and third axis 314 of length $\sqrt{C}$.

In a preferred embodiment, the inertial ellipsoid (described in the next section with respect to step 206), rotated to be aligned with the coordinate axes, is the default choice for projective body 302. In a first alternative embodiment, user 102 selects a projective body from a menu of available options. In another alternative embodiment, a particular projective body is selected automatically from a library of one or more projective bodies. Step 204 encompasses both calculating an appropriate projective body 302 (e.g., calculating the preferred inertial ellipsoid), or retrieving a projective body 302 from computer usable medium 110, or some other digital memory (not shown) accessible via communication link 112.

Positioning and Orienting

In step 206, surface 300 and projective body 302 are positioned and oriented with respect to each other. As described above, surface 300 is preferably shifted (to achieve the correct position) and rotated (to achieve the correct orientation) relative to projective body 302. The shift is calculated as the translation necessary to align the centers of gravity of surface 300 and projective body 302. The rotation is preferably calculated as a rotation matrix R, which describes the rotation necessary to align the orientation of the centered surface 300 and projective body 302.

Figure 5:
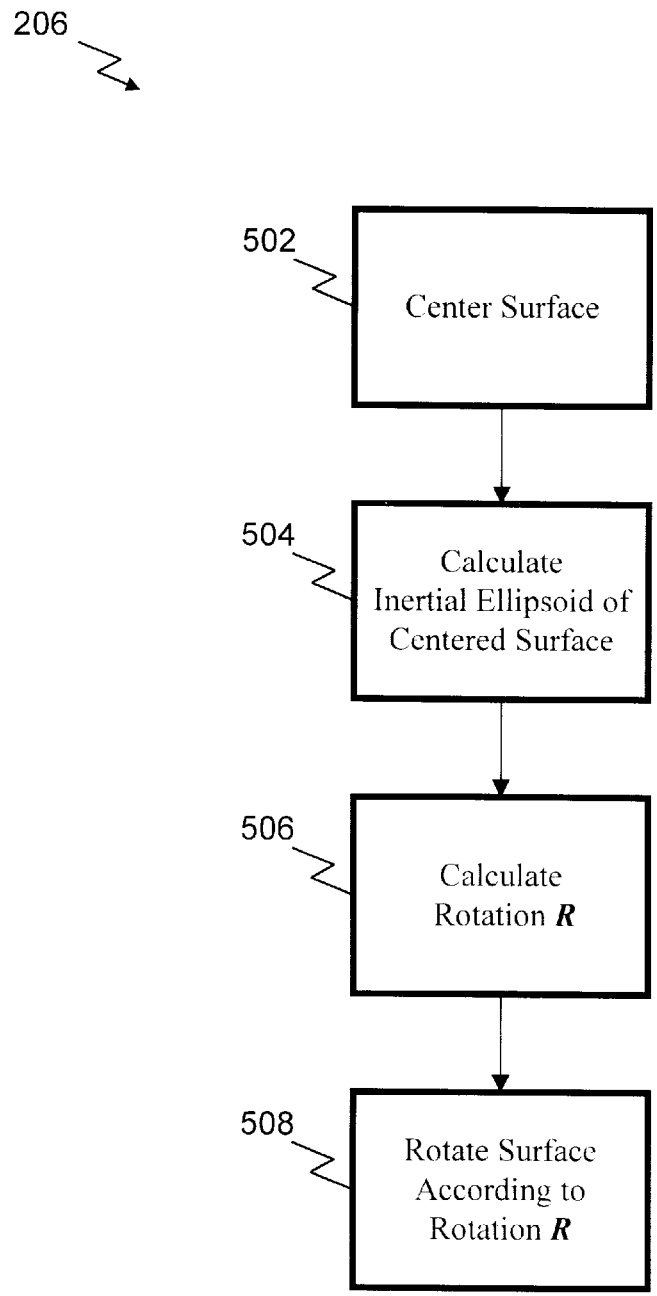
FIG. 5 is a flowchart providing further details related to the positioning and orienting of the surface with respect to the projective body.

FIG. 5 is a flowchart depicting step 206 in greater detail. In step 502, surface 300 is shifted so that its center of gravity is aligned with the center of gravity of projective body 302 (the origin in FIG. 3B). This is preferably accomplished by assuming that surface 300 has a uniform density and calculating the center of gravity $(c_x, c_y, c_z)$ of surface 300 according to:

$$c_x = \frac{1}{m}\int_S x\,dS,$$

$$c_y = \frac{1}{m}\int_S y\,dS,$$

$$c_z = \frac{1}{m}\int_S z\,dS,$$

where S is surface 300, and $$m = \int_S dS.$$

Let T be the translation that takes each point (x, y, z) to $(x-c_x, y-c_y, z-c_z)$. The centered surface 300 is given by TS, which has a center of gravity at the origin.

In step 504, the inertial ellipsoid of the centered surface 300 is calculated. The inertial ellipsoid is preferably calculated according to:

$$a = \int_{TS} (y^2 + z^2) dS$$

$$b = \int_{TS} (x^2 + z^2) dS$$

$$c = \int_{TS} (x^2 + y^2) dS$$

$$d = \int_{TS} yz \, dS$$

$$e = \int_{TS} zx \, dS$$

$$f = \int_{TS} xy \, dS$$

As is well known to those skilled in the art, various numerical methods and approximations can be used to calculate the above integrals. Further, conventional methods for boundary integration over linear polyhedra are preferably employed where surface 300 is a polygonal surface.

The inertial ellipsoid of the centered surface 300, TS, is then formed as:

$$ax^2 + by^2 + cz^2 + 2dyz + 2ezx + 2fxy = 1$$

This ellipsoid, and in particular its principle axes, encodes information about the symmetries and orientation of TS. If TS has an axis or plane of symmetry, this will correspond to one of the principle axes or planes of the inertial ellipsoid. The relative lengths of the principle axes of the inertial ellipsoid will reflect the relative proportions of TS. The inertial ellipsoid does not approximate TS in size. In fact, the inertial ellipsoid of TS shrinks as TS grows. But in terms of shape and orientation, it is a first order approximation of TS.

In step 506, the rotation matrix R is calculated, where R is a rotation that orients the inertial ellipsoid such that the principle axes of the inertial ellipsoid are aligned with the x,y, and z coordinate axes in order of decreasing length. The rotation matrix R is preferably calculated using conventional eigen analysis methods.

As mentioned above, the rotated inertial ellipsoid is preferably used as projective body 302. The rotated inertial ellipsoid conforms to the equation given above for ellipsoidal projective body 302. The values A, B, and C are taken from the eigenvalues generated in step 506, according to techniques well known to those skilled in the art. In case the inequality $A \geq B \geq C \geq 0$ is not strict, A, B, and C are preferably perturbed by a small amount to introduce strict inequality.

In step 508, the centered surface 300 is rotated according to rotation matrix R.

Ellipsoidal Projection

Returning to FIG. 2, in step 208, surface 300 (positioned and oriented) is projected onto projective body 302. In a preferred embodiment, an ellipsoidal projective body is used and the projection of step 208 is preferably accomplished by calculating ellipsoidal coordinates (u', v', w') for each point (x, y, z) on surface 300, and then discarding the w' coordinate. Discarding the w' coordinate has the effect of projecting surface 300 onto the surface of ellipsoidal projective body 302. All those points on surface 300 which have ellipsoidal coordinates sharing the same u' and v' coordinates but varying w' coordinates, map to the same point on ellipsoidal projective body 302, i.e., these points lie on common lines of projection. Therefore, the mapping between surface 300 and ellipsoidal projective body 302 is not necessarily one-to-one. For example, surfaces 300 containing certain concavities can result in a non-one-to-one projection to projective body 302. Though non-optimal, this trait is shared by all projection methods for texture mapping.

The ellipsoidal coordinates (u',v',w') are calculated for each point (x,y,z) on surface 300 by finding the roots of the following cubic polynomial in $\lambda$:

$$f(\lambda)=(B-\lambda)(C-\lambda)x^2+(A-\lambda)(C-\lambda)y^2+(A-\lambda)(B-\lambda)z^2-(A-\lambda)(B-\lambda)(C-\lambda)$$

Substituting in the values for the particular point in space (x,y,z) and the values for A, B, and C corresponding to the selected ellipsoidal projective body 302, and solving for $\lambda$ results in three real roots, u', v', w', where A>u'>B>v'>C>w'. These roots are the ellipsoidal coordinates of (x,y,z). Conventional numerical methods are preferably used to solve for the roots of $f(\lambda)$.

Once the ellipsoidal coordinates (u', v', w') have been calculated, the w' coordinate is dropped to obtain the (u', v') projection. Note, however, that solving the cubic equation $f(\lambda)$ provides a mapping between (x,y,z) and (u', v') which is only unique within a given octant of ellipsoidal projective body 302 (and then, only unique for those points (x, y, z) not lying on common lines of projection). That is, all eight points ($\pm x_0$, $\pm y_0$, $\pm z_0$) map to the same (u'$_0$, v'$_0$) because all eight points result in the same polynomial $f(\lambda)$. The mapping between the surface of ellipsoidal projective body 302 and texture rectangle 400 takes this into account and ensures that each point on surface 300 (i.e., all those points along a single common line of projection) map to a unique point on texture rectangle 400. This mapping is the subject of the following section.

Figure 6:
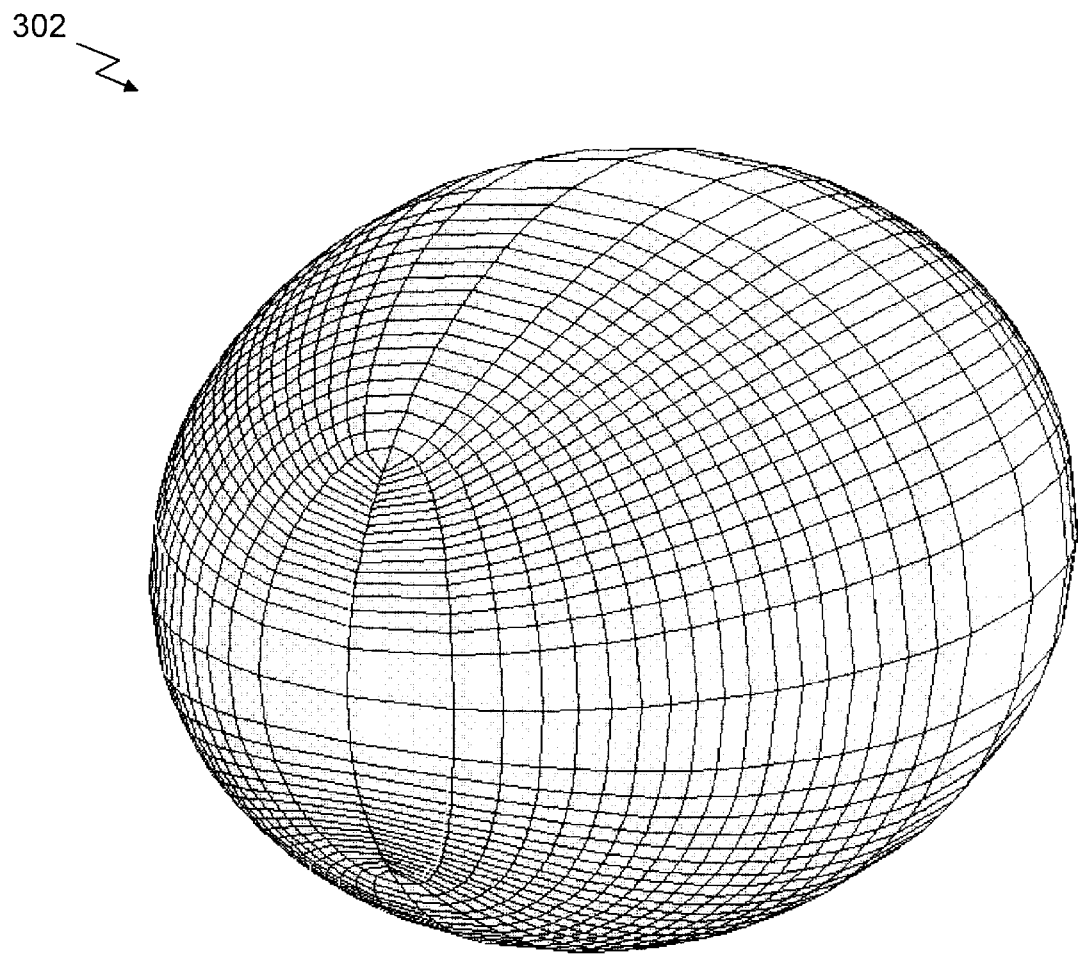
FIG. 6 depicts an ellipsoidal projective body in greater detail.

FIG. 6 depicts the surface of ellipsoidal projective body 302 in greater detail. The isoparametric lines represent constant values of u' (vertical) and v' (horizontal). Within each octant, (u', v') defines a unique point on the surface of ellipsoidal projective body 302.

Mapping Projective Body to Texture Rectangle

Figure 7:
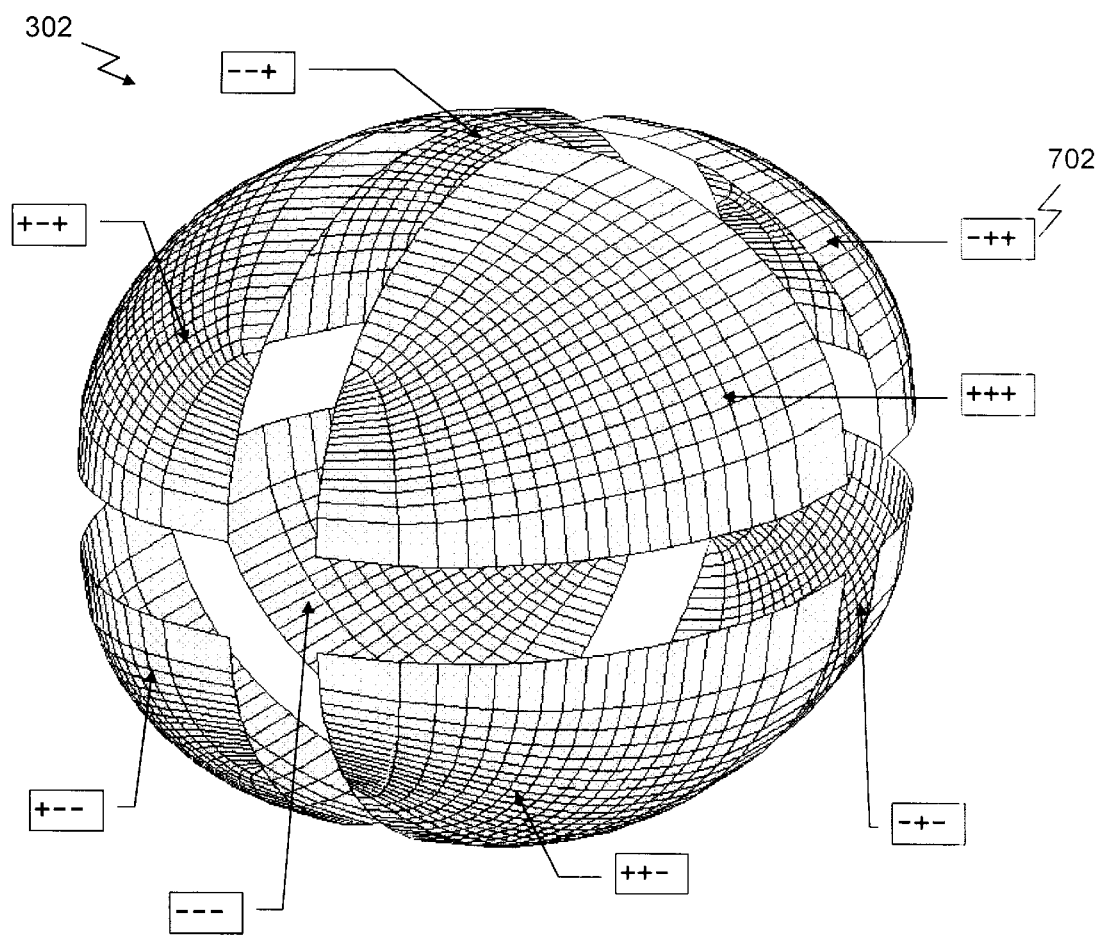
FIG. 7 depicts the octants of an ellipsoidal projective body.

In step 208, points on projective body 302 are mapped to texture rectangle 400. FIG. 7 depicts elliptical projective body 302 broken into eight octants 702. Points within each octant 702, given by a (u', v') unique to that octant, are mapped to a point in a different texture sub-rectangle 402 (see FIG. 4) given by coordinates (u, v).

Each of the eight octants 702 is designated by a combination of pluses (+)'s and minuses (−)'s, depending upon whether the octant is in the positive or negative portion of the x, y, or z axis. The eight octants 702 are given by (+++), (++−), (+−+), (+−−), (−++), (−+−), (−−+), and (−−−). For instance, (+++) indicates the octant of the three-dimensional coordinate system where values for x, y, and z are all positive. Similarly, (+−+) indicates the octant having positive values for x and z, and negative values for y.

Figure 8:
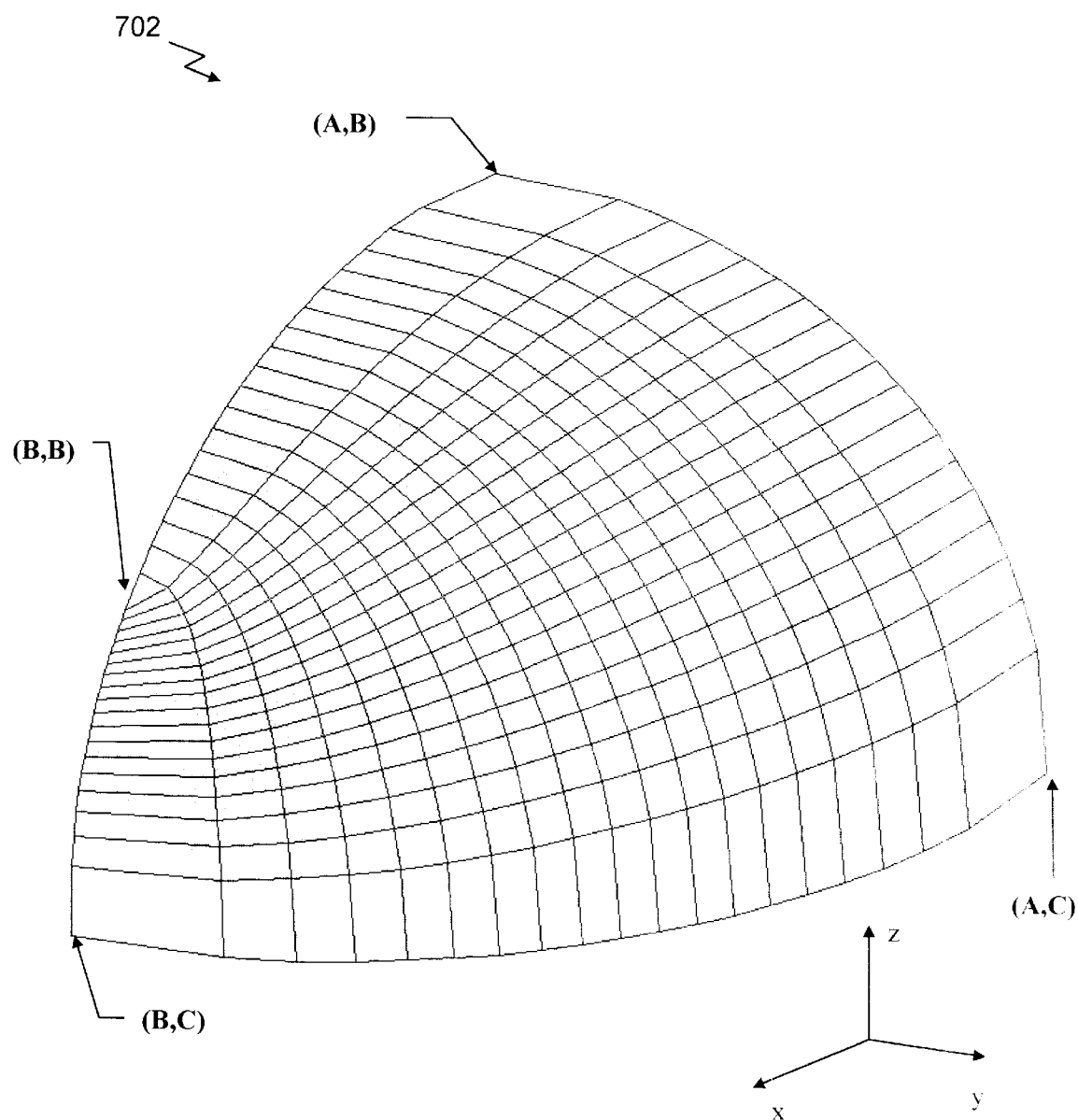
FIG. 8 depicts the (+++) octant of an ellipsoidal projective body.

In a preferred embodiment, the eight octants 702 are mapped to texture rectangle 400 as depicted in FIG. 4. For instance, the (+++) octant is mapped to the bottom, left-hand portion of texture rectangle 400. As noted earlier, for each octant the values of u' are bounded by A>u'>B, and the values of v' are bounded by B>v'>C. Example values of u' and v' are shown in FIG. 8 for the (+++) octant 702. The lower left-hand point of (+++) corresponds to u'=B and v'=C. Similarly, the uppermost point of (+++) corresponds to u'=A and v'=B. Also note that texture rectangle 400 preferably encompasses a range of $0 \leq u \leq 1$, and $0 \leq v \leq 1$, though this particular range is arbitrarily chosen for convenience. The mapping from ellipsoidal projective body 302 to planar map 400 therefore maps values ranging from [B,A]×[C,B] to [0,1]×[0,1].

In one embodiment, each octant 702 is mapped to the appropriate texture sub-rectangle 402 according to a simple linear scaling formula. For instance, consider (+++) octant 702. The points (u', v') on ellipsoidal projective body 302 in this octant are mapped to (+++) texture sub-rectangle 402 according to the following formulas:

$$u = \frac{u' - B}{2(A - B)}$$

$$v = \frac{1}{4} - \frac{v' - C}{4(B - C)}$$

As will be clear to those skilled in the art, similar formulas are used in this embodiment to map the remaining octants 702 to the appropriate texture sub-rectangle 402, in a manner that preserves continuity at the octant boundaries.

Those skilled in the art will also note that many alternative mappings are possible consisting of scaling and joining together the eight octants 702 to form texture rectangle 400.

Compensation Functions

In a preferred embodiment, a compensation function is applied to the texture coordinates (u', v') prior to being mapped to texture rectangle 400. Returning to FIG. 6, note that the isoparametric line spacing is non-uniform, with greater spacing in the vicinity of the octant boundaries of ellipsoidal projective body 302. The application of an appropriate compensation function has the effect of spreading out the isoparametric lines, pushing points near the octant boundaries away from the octant centers. The resulting (u", v") coordinates are more uniform over the surface of ellipsoidal projective body 302.

The (u', v') coordinates in each octant 702 are first scaled to a range of [0,1]×[0,1]. The following formulas are one example of how this scaling can be accomplished:

$$u'_{[0,1]} = \frac{u' - B}{A - B}$$

$$v'_{[0,1]} = \frac{v' - C}{B - C}$$

A compensation function is then applied which maps the ($u'_{[0,1]}$, $v'_{[0,1]}$) coordinates over the range of [0,1]×[0,1] to (u", v") coordinates over the same range. The following compensation function is preferably used:

$$u'' = \sigma^{-1}(u'_{[0,1]})$$

$$v'' = \sigma^{-1}(v'_{[0,1]})$$

where $$\sigma(t) = -2t^3 + 3t^2$$

Since $\sigma(t)$ is a cubic function that is defined on the interval [0,1] it is invertible by well known numerical methods. Those skilled in the art will recognize that many alternative compensation functions $\sigma(t)$ are available that would accomplish the same purpose, so long as the alternatives map [0,1]→[0,1] and have an S-shaped graph.

The compensated ellipsoidal coordinates (u", v") are then, as described above, mapped to the appropriate texture sub-rectangle 402. Since the (u", v") coordinates have a range of [0,1]×[0,1] rather than [B,A]×[C,B], slightly different formulas must be used to perform the appropriate mapping. For instance, (+++) octant 702 maps to (+++) texture sub-rectangle 402 according to the formula:

$$u = \frac{u''}{2}$$

$$v = \frac{(1 - v'')}{4}$$

Those skilled in the art will recognize that similar formulas can be used to map the remaining octants 702 to the appropriate texture sub-rectangle 402.

Figure 9:
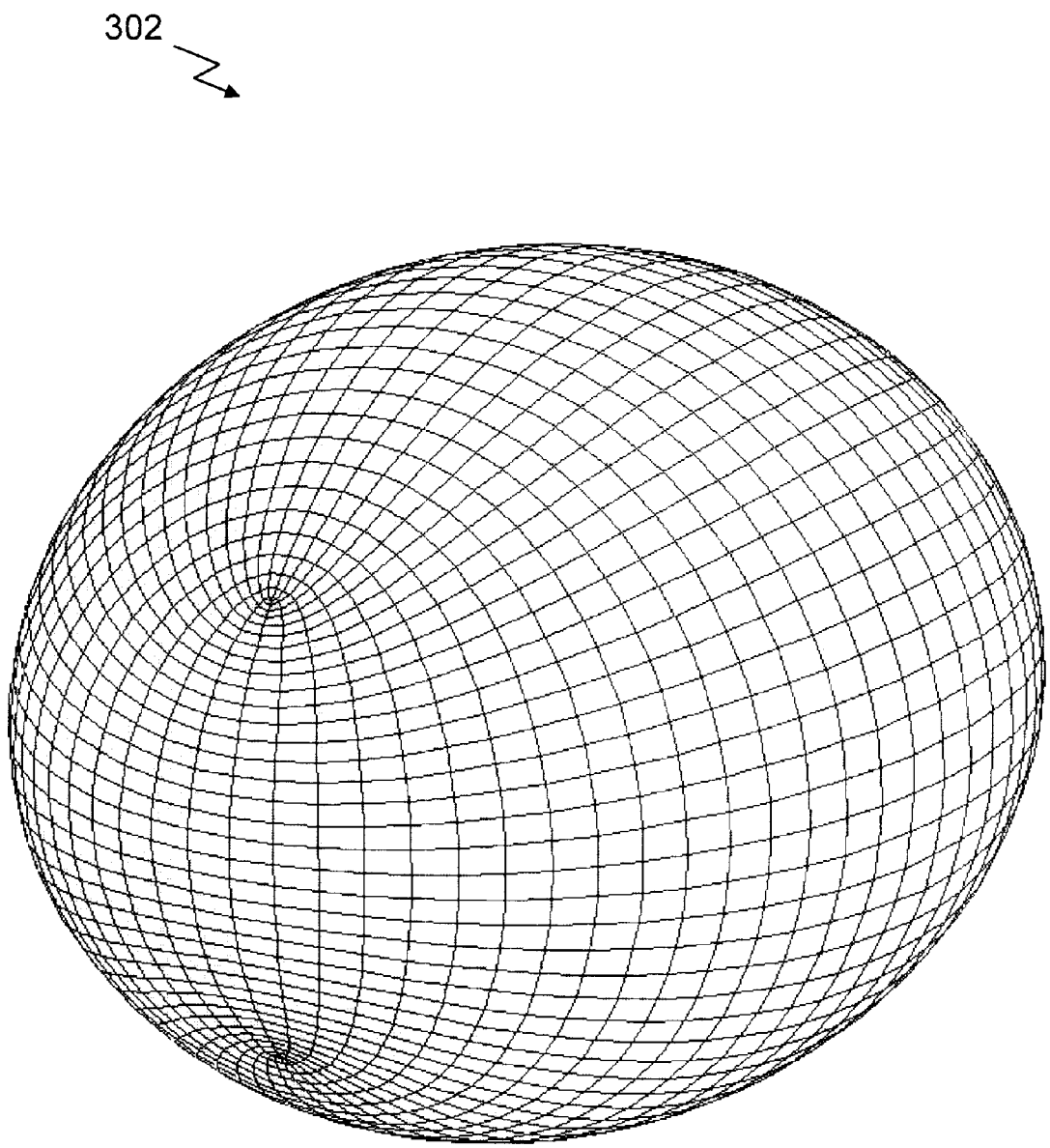
FIG. 9 depicts an ellipsoidal projective body after having applied a compensation function.

FIG. 9 depicts ellipsoidal projective body 302 where the above compensation function was applied to the texture coordinates (u', v'). A comparison with FIG. 6 shows the more uniform parameterization that results from applying the preferred compensation function.

Figure 10A:
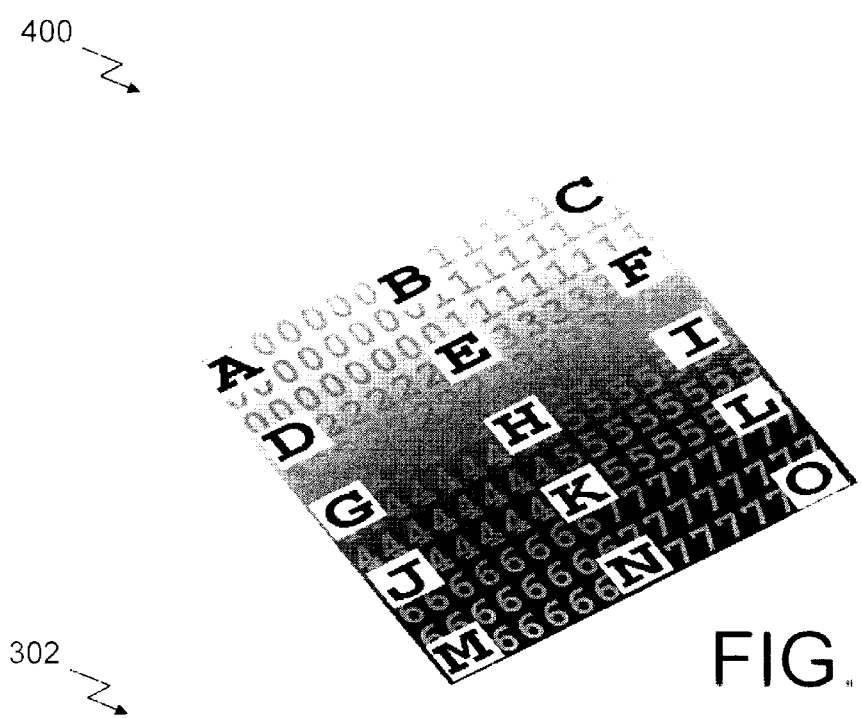
FIG. 10A depicts an example texture rectangle 300.
Figure 10B:
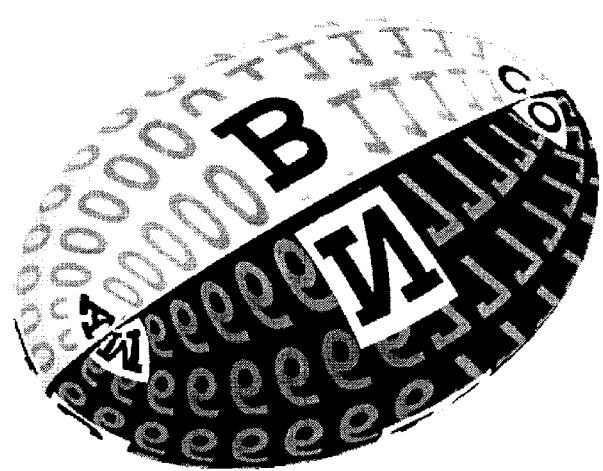
FIG. 10B depicts the example texture rectangle mapped onto the surface of an ellipsoidal projective body.

FIG. 10A depicts an example texture rectangle 400, having a texture map composed of letters and numbers of various shades. FIG. 10B depicts the example texture rectangle 400 mapped onto ellipsoidal projective body 302 according to the present invention, where the compensation function given above was applied to ellipsoidal projective body 302. Note that the proportions of the ellipsoidal projective body depicted in FIG. 10B differ from the ellipsoidal projective bodies depicted in other drawings.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A method of calculating texture coordinates for a surface, comprising the steps of:

(a) aligning the centers of gravity of the surface and a projective body;

(b) calculating an inertial ellipsoid of the surface;

(c) calculating a transformation that aligns said inertial ellipsoid and said projective body, said transformation comprising a rotation of said inertial ellipsoid;

(d) adjusting the relative orientation between the surface and said projective body according to said transformation;

(e) projecting the surface onto said projective body; and (f) mapping said projective body to a texture rectangle.

2. The method of claim 1, wherein said projective body is selected from the group of an ellipsoid, a sphere, a cylinder, and a rectangle.

3. A method of calculating texture coordinates for a surface, comprising the steps of:

(a) calculating an inertial ellipsoid of the surface;

(b) calculating a transformation that aligns said inertial ellipsoid and a projective body, wherein said projective body is an ellipsoid including eight octants;

(c) adjusting the relative orientation and position between the surface and said projective body according to said transformation;

(d) projecting the surface onto said projective body; and (e) mapping said projective body to a texture rectangle, wherein said texture rectangle includes eight texture sub-rectangles, and wherein said mapping step comprises the step of mapping each octant to a unique texture sub-rectangle.

4. The method of claim 1, further comprising the step of applying a compensation function.

5. The method of claim 3, wherein said step of projecting comprises the steps of:

(d1) calculating ellipsoidal coordinates for the surface; and (d2) dropping one of said ellipsoidal coordinates.

6. The method of claim 1, wherein said inertial ellipsoid is used as said projective body.

7. The method of claim 1, wherein the surface is a polygonal surface.

8. A method of calculating texture coordinates for a surface, comprising the steps of:

(a) selecting an ellipsoidal projective body;

(b) aligning the centers of gravity of the surface and said projective body;

(c) projecting the surface onto said ellipsoidal projective body using ellipsoidal coordinates; and (d) mapping said ellipsoidal projective body to a texture rectangle.

9. A method of calculating texture coordinates for a surface, comprising the steps of:

(a) selecting an ellipsoidal projective body, wherein said ellipsoidal projective body includes eight octants;

(b) projecting the surface onto said ellipsoidal projective body using ellipsoidal coordinates; and (c) mapping said ellipsoidal projective body to a texture rectangle, wherein said texture rectangle includes eight texture sub-rectangles, and wherein said mapping step comprises the step of mapping each octant to a unique texture sub-rectangle.

10. The method of claim 9, further comprising the step of applying a compensation function.

11. The method of claim 10, wherein said step of projecting comprises the steps of:

(b1) calculating ellipsoidal coordinates for the surface; and (b2) dropping one of said ellipsoidal coordinates.

12. A computer program product comprising a computer usable medium having computer program logic stored therein, wherein said computer program logic comprises:

receiving means for enabling a computer to receive a surface;

aligning means for enabling said computer to align the centers of gravity of the surface and a projective body;

first calculating means for enabling said computer to calculate an inertial ellipsoid of said surface;

second calculating means for enabling said computer to calculate a transformation that aligns said inertial ellipsoid and said projective body, said transformation comprising a rotation of said inertial ellipsoid;

adjusting means for enabling said computer to adjust the relative orientation between said surface and said projective body according to said transformation;

projection means for enabling said computer to project said surface onto said projective body; and mapping means for enabling said computer to map said projective body to a texture rectangle.

13. The computer program product of claim 12, wherein said projective body is selected from the group of an ellipsoid, a sphere, a cylinder, and a rectangle.

14. A computer program product comprising a computer usable medium having computer program logic stored therein, wherein said computer program logic comprises:

receiving means for enabling a computer to receive a surface;

first calculating means for enabling said computer to calculate an inertial ellipsoid of said surface;

second calculating means for enabling said computer to calculate a transformation that aligns said inertial ellipsoid and a projective body, wherein said projective body is an ellipsoid including eight octants;

adjusting means for enabling said computer to adjust the relative orientation and position between said surface and said projective body according to said transformation;

projection means for enabling said computer to project said surface onto said projective body; and mapping means for enabling said computer to map said projective body to a texture rectangle, wherein said texture rectangle includes eight texture sub-rectangles, and wherein said mapping means maps each octant to a unique texture sub-rectangle.

15. The computer program product of claim 12, further comprising compensation means for enabling said computer to apply a compensation function.

16. The computer program product of claim 14, wherein said projection means comprises:

third calculating means for enabling said computer to calculate ellipsoidal coordinates for said surface; and means for enabling said computer to drop one of said ellipsoidal coordinates.

17. The computer program product of claim 12, wherein said inertial ellipsoid is used as said projective body.

18. The computer program product of claim 12, wherein said surface is a polygonal surface.

* * * * *